Patented Aug. 9, 1932

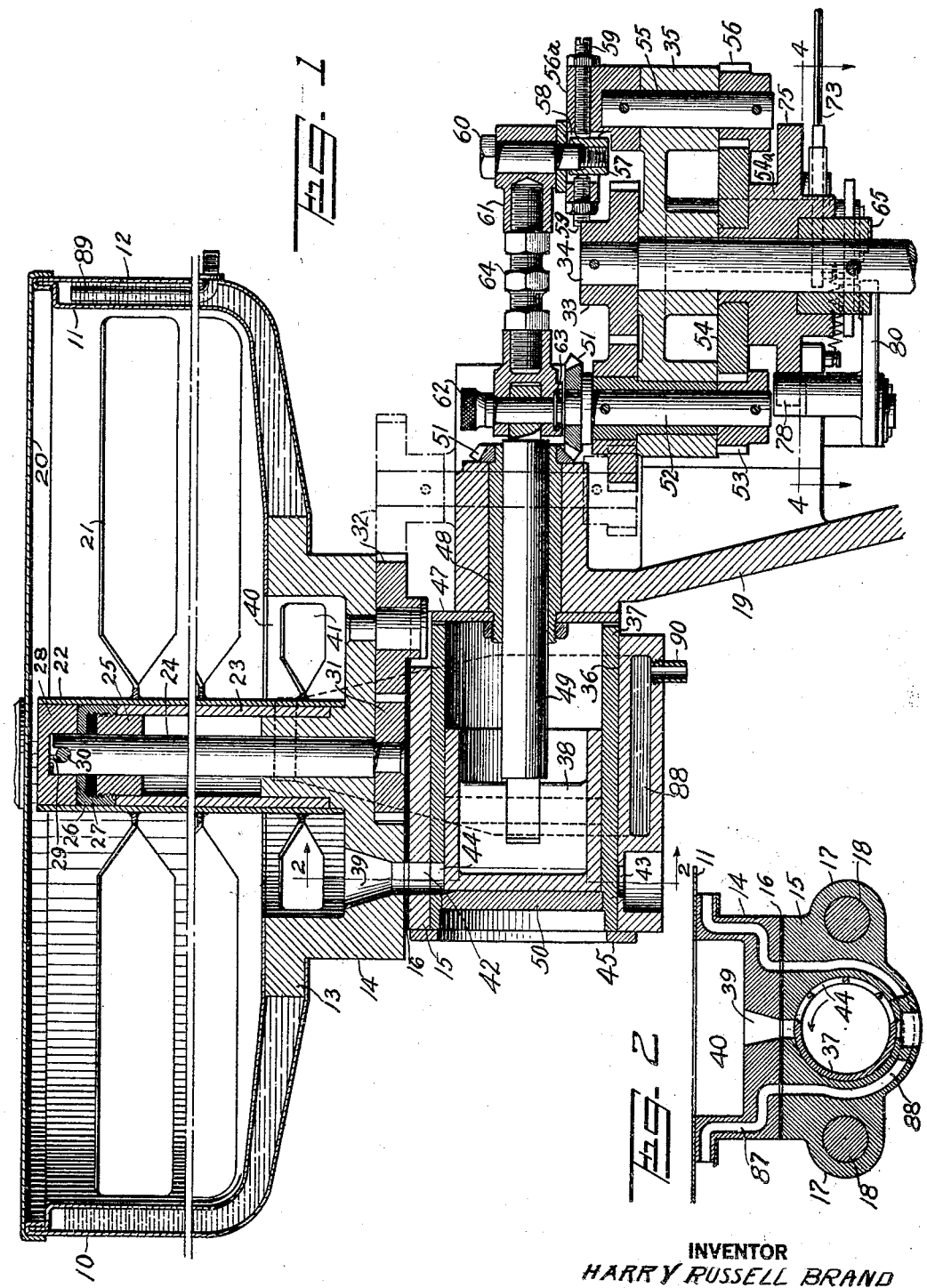

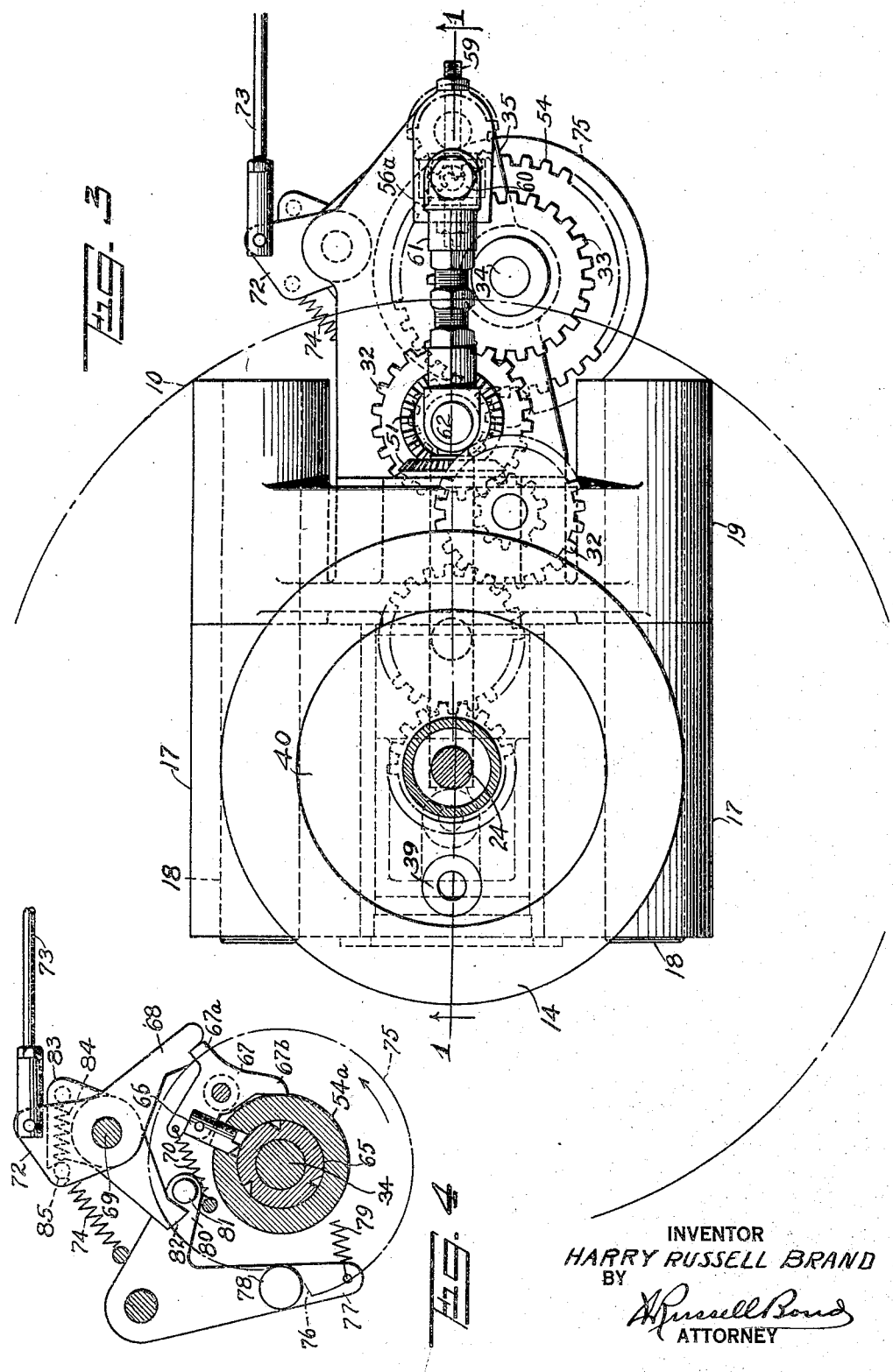

1,870,889

UNITED STATES PATENT OFFICE

HARRY RUSSELL BRAND, OF NEW YORK, N. Y.

DISPENSING MECHANISM

Application filed November 7, 1929. Serial No. 405,355.

My invention relates to dispensing mechanisms and particularly to means for dispensing measured volumes of material from a receptacle.

An object of my invention is to provide a valve mechanism which will withdraw a fluid from a reservoir in portions of uniform volume regardless of variations in the head of the fluid in the reservoir and which will discharge each of said portions positively.

A further object is to provide in association with the valve mechanism, means for agitating the contents of the reservoir, so that the portions withdrawn from the reservoir will be of substantially uniform specific gravity.

The present invention is a variant of that disclosed in my copending application Serial No. 322,874, filed November 30, 1928, and it is particularly adapted for use in automatic griddle cake machines, such, for example, as that disclosed in my copending application Serial No. 299,582, filed August 14, 1928. In such machines it is desirable to discharge batter in portions of uniform volume and specific gravity upon a griddle, and my invention is particularly adapted to fulfill these desiderata.

One of the difficulties encountered in automatic griddle cake machines is that of keeping the batter reservoir cool so as to prevent the batter from spoiling and also of maintaining the batter at such constant temperature that it will not vary in consistency. It is an object of the present invention to provide in connection with the batter reservoir and the valve mechanism a cooling system by which the batter may be maintained at a uniform temperature regardless of surrounding temperature conditions.

The particular machine referred to in my copending application Serial No. 299,582, is so arranged that when the batter is exhausted or practically exhausted, the reservoir may be removed from the machine and refilled or replaced with another reservoir. In removing the reservoir from the machine, it is desirable to move the dispensing valve therewith. It is an object of the present invention to provide a dispensing valve attached to a batter reservoir in which the valve may be readily disconnected from its operating means and as readily connected thereto.

With the above named objects in view and others which will appear hereinafter I shall now describe a preferred embodiment of my invention and shall thereafter point out the novelty and scope of the invention in the claims.

In the accompanying drawings:

Figure 1 is a view in vertical section illustrating my improved valve applied to a batter reservoir, together with mechanism for operating the valve, the section being taken substantially on the line 1—1 of Fig. 3.

Fig. 2 is a fragmentary view in transverse section with a plunger element removed, the section being taken substantially on the line 2—2 of Fig. 1.

Fig. 3 is a plan view of the valve and valve mechanism with all but a small portion of the batter reservoir removed; and Fig. 4 is a view in section of a clutch mechanism, the section being taken on the line 4—4 of Fig. 1.

As shown particularly in Fig. 1, the batter reservoir 10 is provided with spaced double walls 11 and 12 respectively, which are connected together at their upper ends. At the bottom of the reservoir said walls are secured to an annular flange 13 formed on a base member 14. The member 14 is secured to a valve casing 15 with an intervening strip of packing material 16 to seal the joint therebetween. The valve casing 15 is provided at each side with sleeve portions 17 adapted to slide upon studs or rods 18 projecting from the frame 19 of the griddle cake machine.

The batter reservoir is closed at the top by means of a lid 20. In order to keep the batter suitably agitated, I provide a series of blades 21 which project from a hub sleeve 22, mounted to turn on a bearing sleeve 23 vertically disposed in the middle of the reservoir. Extending upward through this sleeve 23 is a shaft 24 which is journaled near its lower end in the base member 14, while its upper end is journaled in a block 25 fitted in the sleeve 23. To prevent leakage of the contents of the reservoir, a cap 26 is fitted on the shaft 24 and screwed upon the bearing block 25 with packing material 27 therebetween. The hub sleeve 22 is fitted with a thrust block 28 at its upper end which is recessed to receive the upper end of the shaft 24. A cross pin 29 secured to the block within the recess, rests in a transverse notch 30 in the end of the shaft 24, so that rotation of said shaft will cause the blades 21 to revolve and agitate the contents of the reservoir. It will be obvious that by this arrangement, the hub 22 bearing the agitator blades may be lifted out of the reservoir whenever desired, and when the hub is dropped into place over the bearing sleeve 23, the cross pin 29 will find its place in the slot 30.

Secured to the lower end of the shaft 24 which projects through the base member 14, is a pinion 31. The latter is driven through a suitable train of gears 32 by a pinion 33 fixed upon a power shaft 34. The shaft 34 is journaled in a bracket 35 carried by the frame of the machine. Since the shaft 34 is constantly rotating the blades 21 will be revolved through the batter in the reservoir and will keep the batter constantly stirred. The gearing, however, is so chosen that the motion of the blades 21 will be comparatively slow.

The valve casing 15 is formed with a horizontal cylindrical valve chamber 36 in which a valve sleeve 37 is adapted to rotate. Fitted to reciprocate in the valve sleeve is a plunger 38. The base member 14 of the reservoir has an outlet port 39 which leads out from the bottom of an annular recess 40 formed in the base member 14. Within the recess I provide a set of small agitator blades 41 which are secured to the hub sleeve 22 and serve to keep the contents of the reservoir properly stirred adjacent the outlet port.

The valve casing 15 has an intake opening 42 which registers with the port 39 through a suitable opening in the packing material 16, thus, providing communication between the reservoir and the valve chamber 36. Also leading out of the valve chamber 36 at a point diametrically opposite the intake opening is a discharge opening 43. At all times one or the other of these ports is closed by the valve sleeve 37. The latter is provided with a slot 44 in the cylindrical wall thereof. This slot is adapted to register with the openings 42 and 43 but it is somewhat less than 180 degrees in extent, so that it can uncover only one of said openings at a time. When the sleeve is in the normal position shown in Fig. 2 both the intake port 42 and the discharge port 43 will be closed thereby, but when the sleeve is rotated in the direction of the arrow, the intake port will first be opened to the interior of the sleeve valve and then before the sleeve valve has moved through an angle of 180 degrees, the intake opening will be closed and the discharge opening will thereafter be opened. It will be understood that the slot 44 may be continuous, but as shown in the drawings it is preferably interrupted by narrow connecting walls.

The sleeve valve 37 is prevented from moving endwise toward the left as shown in Fig. 1 by means of a flange ring 45 secured to the outer end of the valve casing 15. The opposite end of the sleeve valve is formed with notches to engage a spider 47 secured to a sleeve 48 journaled in a suitable bearing in the frame 19.

The plunger 38 is provided with a rod 49 which slides in the sleeve 48. When the plunger is in normal position shown in Fig. 1 it bears against an outer end wall 50 in the sleeve valve 37. This end wall slightly oversteps the slot 44, as shown in Fig. 1, so that there will be no possibility of trapping any material in the sleeve valve when the plunger is moved therein against the end wall 50.

To rotate the sleeve valve, I provide a pair of miter pinions 51 secured respectively to the sleeve 48 and to a vertical shaft 52. The latter is suitably journaled in the bracket 35. Secured to the lower end of the shaft 52 is a spur pinion 53 which engages a driving gear 54. The latter is mounted to turn freely on the shaft 34, but may be connected thereto by clutch mechanism presently to be described.

Mounted in the bracket 35 is a second vertical shaft 55 to the lower end of which is fixed a spur pinion 56 meshing with the driving gear 54. Fixed to the upper end of the shaft 55 is a crank 56a. A slide block 57 is adjustable in a slot 58 in the crank 56a. This slot is disposed radially to the axis of shaft 55 and the block 57 is held in the desired adjustment therein by means of opposed adjusting screws 59. A crank pin 60 is screwed into the slide block 57 and provides a pivotal connection for one end of a link 61. The opposite end of the link is pivotally connected to the plunger rod 49 by means of a removable hinged pin 62, the latter being provided with suitable spring means 63 to hold it in place. The link 61 includes a turn buckle 64 by which its length may be adjusted.

The clutch mechanism above referred to is shown clearly in Figs. 1 and 4. Keyed to the shaft 34 is a clutch collar 65 formed with notches in its periphery. This member rotates within a recess in the hub 54a of the driving gear 54. Mounted to slide radially in said hub is a pin 66 which is formed at its inner end with a tooth adapted to engage one of the notches in the clutch member 65, thus clutching the driving gear to the shaft 34. The clutch pin 66 is carried by one arm of a three-armed lever 67 pivoted on the hub 54a. A second arm 67a of this lever is normally engaged by an arm 68 of a clutch release lever. The third arm 67b of a lever 67 normally bears against the hub 54 as a stop, as shown in Fig. 4. A spring 70 acting on the three-armed lever 67 urges the pin 66 into engagement with the member 65, but such engagement is normally prevented by engagement of arm 67a with the arm 68. The arm 68 is pivoted on a stud 69 fixed to the frame 19 and is formed with an opposed extension 72 to which an operating rod 73 is connected. A spring 74 acting on the extension 72 tends to draw the arm 68 out of engagement with the lever 67, so that when the rod 73 is moved in the direction of the arrow permitting such disengagement the spring 70 will move the pin 66 into engagement with a notch in the clutch member 65, thereby connecting the hub 54a to shaft 34. As long as the arm 68 is retracted by spring 74 the driving gear 54 will be clutched to the shaft 34. When, however, the rod 73 is pulled to bring the arm 68 to the position shown in Fig. 4, the lever 67a will strike said arm 68 upon completion of its revolution withdrawing the pin 66 from the clutch member 65.

To facilitate withdrawal of the pin I provide on the hub of the driving gear a disk cam 75 which has a spiral contour with an inclined shoulder 76 connecting the outer and inner ends of the spiral. Pivoted on the frame 19 adjacent the cam 75 is a lever 77 which bears a roller 78 adapted to engage the periphery of the cam 75 under the pull of a strong spring 79. Just as the lever 67a is about to strike the arm 68 the roller 78 rides down the incline 76 tending to advance the cam 75 and hub 54a with respect to the driving shaft 34. Consequently, the driving gear 54 by over-riding the clutch member 65 will release the pin 66 and permit it to be withdrawn freely.

However, it is not desirable to have the roller 78 overdrive the cam at each rotation thereof while the arm 68 is retracted because this would produce an objectionable irregularity in the rotation of the driving gear 54 and the parts operated thereby. Mechanism is, therefore, provided for holding the roller 78 out of engagement with the shoulder 76 except when the arm 68 is in position to engage the arm 67a. To this end the lever 77 has an angularly disposed arm 80 which bears a pin 81. When the arm 77 is moved outward by engagement with the cam 75, the pin 81 will clear the end of a latch arm 82. The latter is mounted on the stud 69 and has a rearward extension 83 connected by a spring 84 to the extension 72. The spring 84 presses the arm 83 against a pin 85 on extension 72, thus providing a flexible connection between the arm 82 and the arm 68. If the rod 73 is released to permit spring 74 to retract the arm 68 the arm 82 will be pressed against the pin 81. As the cam 75 swings the arm 77 outward, the pin 81 is also swung outward until the arm 82 snaps past the pin 81 and the end of the arm 82 then lies in the path of the pin preventing it from returning to normal position. Thus the lever 77 is held outward so that the roller 78 cannot ride down the inclined shoulder 76. But, when the rod 73 is pulled to restore the arm 68 to engaging position, the arm 82 will be pulled out of engagement with the pin 81, so that the roller 78 will be free to ride down to shoulder 76 and relieve lateral pressure on the pin 66 while the latter is being withdrawn from engagement with the clutch member 65.

The operation of the dispencing mechanism is as follows: When the pull rod 73 is released to clutch the driving gear 54 to the shaft 34, the sleeve valve 37 will be rotated in the direction of the arrow, in Fig. 2, so that slot 44 will uncover the ports 39 and 42. At the same time the plunger 38 will be moved toward the right in Fig. 1, drawing batter through said ports and the slot 44 into the sleeve valve 37. As the latter rotates it eventually cuts off the intake port 44 and immediately thereafter opens the discharge port 45. The plunger 38 then moves in the opposite direction and forces the batter out of the sleeve valve through the discharge port. The particular mechanism illustrated is adapted to discharge three portions of batter for each complete rotation of the driving gear 54. In other words, there is a three-to-one gear ratio between the driving gear 54 and the pinions 53 and 56. Thus a momentary release of the pull rod 73 will cause the sleeve valve to make three complete rotations and the plunger to make three complete reciprocations, the parts then coming to rest in the position shown in Figs. 1 and 2. If the pull rod 73 is maintained in released position, the sleeve valve and plunger will continue to operate and will not stop when the rod 73 is retracted until they have completed the cycle of three operations which they were performing at the time the rod was pulled.

The agitator blades 21 and 41 will continue to rotate slowly whether or not the valve mechanism is being operated thus keeping the batter constantly stirred and at uniform consistency even though it may have to stand unused for a considerable period of time. The stroke of the plunger which determines the volume of batter discharged at each operation of the valve mechanism may be very accurately regulated by means of the adjusting screws 59. While the position of the plunger may be adjusted by the turn buckle 64, so that at the end of its discharge stroke it will bear against the plate 50 and cause complete discharge of the batter drawn into the valve sleeve on the previous suction stroke.

To keep the contents of the reservoir cool, I circulate a cooling fluid, such as brine, in the water jacket formed between the walls 11 and 12. This water jacket is extended through the base member 14, as shown at 87 in Fig. 2, and communicates with a water jacket 88 formed in the valve casing 15 and surrounding the valve chamber 88. The brine is fed into the water jacket through a stand pipe 89 which rises to a point close to the top of the reservoir and discharges through a pipe 90 leading out of the bottom of the valve casing.

When it is desired to remove the reservoir from the machine, the pipes 89 and 90 are disconnected and the hinge pin 62 is withdrawn from the link 61; then the reservoir and the valve casing may be drawn off the studs 18. The sleeve valve will be drawn out of engagement with the spider or clutch member 47 and be drawn off with the valve casing, and the plunger will also be drawn off with the sleeve valve. When restoring the reservoir to position, the studs 18 act as guides to bring the plunger rod into alinement with the bore of sleeve 48. Suitable latch means (not shown) may be provided for locking the valve casing on the studs 18.

While I have described above a specific embodiment it will be understood that this is to be taken as illustrative and not limitative of my invention, and that I may make various changes in form, construction and arrangements of parts without departing from the spirit and scope of my invention as pointed out in the following claims:

I claim:

1. A dispensing mechanism, comprising a casing formed with a cylindrical valve chamber having an intake port and an outlet port, a sleeve valve rotatable in the chamber and normally closing both of said ports, said sleeve valve being closed at one end and having a slot therein adapted to connect said ports successively to the interior of the sleeve, a plunger reciprocable in the sleeve valve, and means for rotating the sleeve valve and reciprocating the plunger in mutually timed relation, the slot being of such extent that the intake port will be fully open during substantially the entire outward stroke of the plunger and the outlet port will be fully open during substantially the entire inward stroke of the plunger.

2. A dispensing mechanism, comprising a casing formed with a cylindrical valve chamber having an intake port and an ouelet port disposed respectively in diametrically opposed relation, a sleeve valve rotatable in said chamber and having a slot therein and lying in the plane of said ports, a transverse wall closing the end of the sleeve valve, the inner face of said wall being substantially flush with the outer wall of said slot, a plunger reciprocable in the sleeve valve toward and from said wall, and means for reciprocating the plunger to and from said wall in timed relation to the rotation of the sleeve, the slot being of such extent that the intake port will be fully open during substantially the entire outward stroke of the plunger and the outlet port will be fully open during substantially the entire inward stroke of the plunger.

3. In combination, a reservoir, a valve casing connected thereto and formed with a cylindrical valve chamber, the casing being also formed with an intake port connecting said chamber and said reservoir, and an outlet port leading from said chamber, a sleeve valve rotatable in said chamber and having a slot therein adapted to open and close said ports successively but not simultaneously to the interior of the sleeve valve, a plunger reciprocable in the sleeve valve, actuating mechanism for rotating the plunger, a drive shaft, a clutch for operatively connecting said actuating mechanism to said shaft, a trip for disconnecting said clutch means when the actuating mechanism has completed a cycle of operation, means for setting said trip, said clutch including a driving and a driven member with means for over-throwing the latter at the end of the cycle of operations to facilitate release of the clutch, and means for rendering the over-throwing means inoperative until the clutch release device has been set to disconnect the clutch.

4. A dispensing mechanism comprising a casing formed with a cylindrical valve chamber having an intake port and an outlet port in diametrically opposed position, a sleeve valve rotatable in the chamber, said sleeve valve having a slot therein adapted to open and close said ports successively as the sleeve is rotated, a closure for one end of the sleeve valve adjacent the slot, a plunger reciprocable in the sleeve valve toward and from said closure, a crank adapted to reciprocate the plunger, and means for simultaneously rotating the sleeve and crank, said slot being of such extent that the intake port will be fully open during substantially the entire outward stroke of the plunger and the outlet port will be fully open during substantially the entire inward stroke of the plunger.

5. A dispensing mechanism comprising a casing formed with a cylindrical valve chamber having an intake port and an outlet port disposed respectively in diametrically opposed relation, a sleeve valve rotatable in said chamber and having a slot therein lying in the plane of said ports, a transverse wall carried by and closing the end of the sleeve valve, the plane of the inner face of said wall being slightly inwardly off-set with respect to the plane of the outer wall of said slot, the inner face of said wall being beveled to merge with the outer wall of said slot, a plunger reciprocable in the sleeve valve, means for rotating the sleeve valve in timed relation to the reciprocation of the plunger, and means operating to retract the plunger while the intake port is uncovered by the slot and to advance the plunger against said wall while the outlet port is uncovered.

In testimony whereof, I have signed this specification.

HARRY RUSSELL BRAND.